(12) United States Patent
Manteghi

(10) Patent No.: US 9,325,354 B2
(45) Date of Patent: Apr. 26, 2016

(54) WIDEBAND FREQUENCY SHIFT MODULATION USING TRANSIENT STATE OF ANTENNA

(71) Applicant: VIRGINIA TECH INTELLECTUAL PROPERTIES, INC., Blacksburg, VA (US)

(72) Inventor: Majid Manteghi, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/547,772

(22) Filed: Nov. 19, 2014

(65) Prior Publication Data

US 2015/0139278 A1    May 21, 2015

Related U.S. Application Data

(60) Provisional application No. 61/906,652, filed on Nov. 20, 2013.

(51) Int. Cl.
*H04B 1/00* (2006.01)
*H04B 1/04* (2006.01)
*H01Q 3/44* (2006.01)
*H01Q 5/00* (2015.01)
*H01Q 9/04* (2006.01)
*H01Q 5/25* (2015.01)

(52) U.S. Cl.
CPC .. *H04B 1/04* (2013.01); *H01Q 3/44* (2013.01); *H01Q 5/00* (2013.01); *H01Q 5/25* (2015.01); *H01Q 9/0421* (2013.01)

(58) Field of Classification Search
CPC ............ H04B 1/707; H04B 1/04; H01Q 5/00; H01Q 3/44
USPC .......................................................... 375/146
See application file for complete search history.

(56) References Cited

U.S. PATENT DOCUMENTS

| | | | |
|---|---|---|---|
| 6,317,027 B1* | 11/2001 | Watkins | 340/10.1 |
| 2006/0132360 A1* | 6/2006 | Caimi et al. | 343/700 MS |
| 2009/0010360 A1* | 1/2009 | Murdoch | 375/302 |
| 2009/0174501 A1* | 7/2009 | Parsche et al. | 333/174 |
| 2011/0205026 A1* | 8/2011 | Bateman | 340/10.1 |

OTHER PUBLICATIONS

Manteghi, Majid, "A Switch-Band Antenna for Software-Defined Radio Applications", IEEE Antennas and Wireless Propagation Letters, vol. 8, 2009, 3 pages.
Manteghi, Majid, "A Tunable Planar Inverted-f Antenna for Digital Video Broadcast-Handheld Applications", Microwave and Optical Technology Letters, vol. 54, Issue 11, pp. 2635-2638, Nov. 2012, 2 ppages.
Manteghi, Majid, "Antenna Miniaturization Beyond the Fundamental Limits Using Impedance Modulation", Antennas and Propagation Society International Symposium, APSURSI '09. IEEE, 2009, 1 page.

(Continued)

*Primary Examiner* — Erin File
(74) *Attorney, Agent, or Firm* — Forefront IP Lawgroup, PLLC

(57) ABSTRACT

Described herein are architectures, platforms and methods for implementing modulating a radiating signal of a high Q antenna in order to transmit from one frequency to one or more different frequencies which may be in the same narrow band frequency spectrum or in a wide band frequency spectrum.

1 Claim, 6 Drawing Sheets

(56) References Cited

OTHER PUBLICATIONS

Manteghi, Majid, "Electrically Coupled Loop Antenna as a Dual for the Planar Inverted-f Antenna", Microwave and Optical Technology Letters, vol. 55, Issue 6, pp. 1409-1412, Jun. 2013, 4 pages.

Manteghi, Majid, "Non-LTI Systems, a New Frontier in Electromagnetics Theory", Antennas and Propagation Society International Symposium (APSURSI), IEEE, 2010, 1 page.

Salehi, M., et al., "Bandwidth Enhancement Using Nonlinear Inductors", Antennas and Propagation (APSURSI), 2011 IEEE International Symposium on (APSURSI), IEEE, 2011, 1 page.

"Frequency-Shift Keying for Ultrawideband-Achieving Rates of the Order of Capacity"; Cheng Luo and Muriel Medard; Laboratory for Information and Decision Systems, EECS, MIT; Nov. 2002, 12 Pages.

A Wideband Frequency-Shift Keying Demodulator for Wireless Neural Stimulation Microsystems; Dong et al., Journal of Zheijang Unversity; 2006; 5 pages.

* cited by examiner

WIDEBAND FREQUENCY SHIFT MODULATION USING TRANSIENT STATE OF ANTENNA

RELATED APPLICATIONS

This application claims the benefit of priority of U.S. Provisional Patent Application Ser. No. 61/906,652 filed Nov. 20, 2013.

BACKGROUND

Wireless communication techniques have been widely developed and implemented during the past decades due to their extensive applications. One desirable characteristic of most wireless systems is a wide bandwidth. This problem becomes significant when a high-rate data-transmission is required along with a very small-size antenna. Therefore, designing ultra-wideband (UWB) antennas which are capable of transmitting high data-rate information while occupying a small volume, is one of the challenges that has drawn a great deal of attention. For example, biomedical implants are among the many devices that should be small size while transmitting high data-rate information. Other examples of such devices include, and are not limited to, portable communication devices such as cellular telephones, tablets, and other computing devices. Even though a high data-rate can be achieved in broadband systems by increasing the carrier frequency, in low-frequency applications, wideband data-transmission remains an open challenge. It is well-understood that in linear time-invariant (LTI) structures, antenna bandwidth is in contradiction with the size.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for implementing an antenna in a time-varying manner, such that the data-rate is not correlated to the traditional definition of the impedance bandwidth. In particular implementations, a high-Q antenna used. It is typically understood, that antennas with a high Q are narrowband, antennas with a low Q are wideband. The higher the value of Q, the more sensitive the input impedance is to small changes in frequency. As such for a high-Q antenna if the fundamental natural resonance is shifted over time, the electromagnetic fields that construct the stored energy in the near-zone simultaneously shift to a new resonant frequency. Since the radiative power is tightly coupled to the stored energy of the antenna, far-field radiation responds to any abrupt variation of the antenna resonant frequency provided that the total stored energy does not decay dramatically. Therefore, if the resonant frequency of the antenna is switched at a high rate, a fast frequency-shift keying (FSK) modulation may be directly realized. A high-Q antenna may also be used in the transient mode by imposing initial conditions on the current distribution and therefore, a single RF source may be sufficient to excite both resonant frequencies when operating in the transient mode. Therefore, an FSK signal may be generated and transmitted by exciting the high-Q antenna by only a single-tone source without needing to use a voltage controlled oscillator or VCO.

Figure 1:
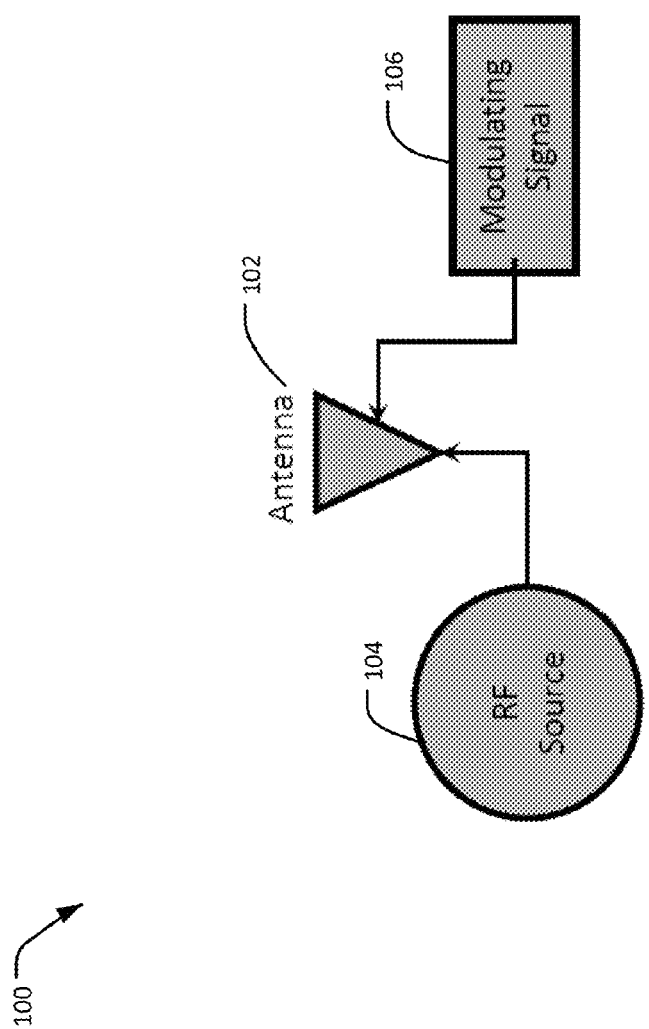
FIG. 1 is an example system that utilizes an antenna to transmit in narrow and wide bandwidth frequencies.

FIG. 1 shows an example system 100 that utilizes an antenna 102 to transmit in narrow and wide bandwidth frequencies. Antenna 102 may be a high Q antenna. In this example, the antenna 102 is connected to a single RF source 104.

A time variant technique may be applied to antenna 102. The time variant technique is based on the transient behavior of antennas, allowing transmission over a wide bandwidth frequency (i.e., high data rate) of information/data using a relatively small antenna. In such implementations, antenna 102 is considered as a relatively small antenna.

In order to implement the time variant technique using an antenna, such as antenna 102, the antenna structure of antenna 102 is made time variant by an external signal, called a modulating signal 106. The antenna structure should be able to respond to the required time variation or frequency shift in the impedance or change in angular behavior in the radiation pattern or change in the magnitude of the radiated signal.

Figure 2:
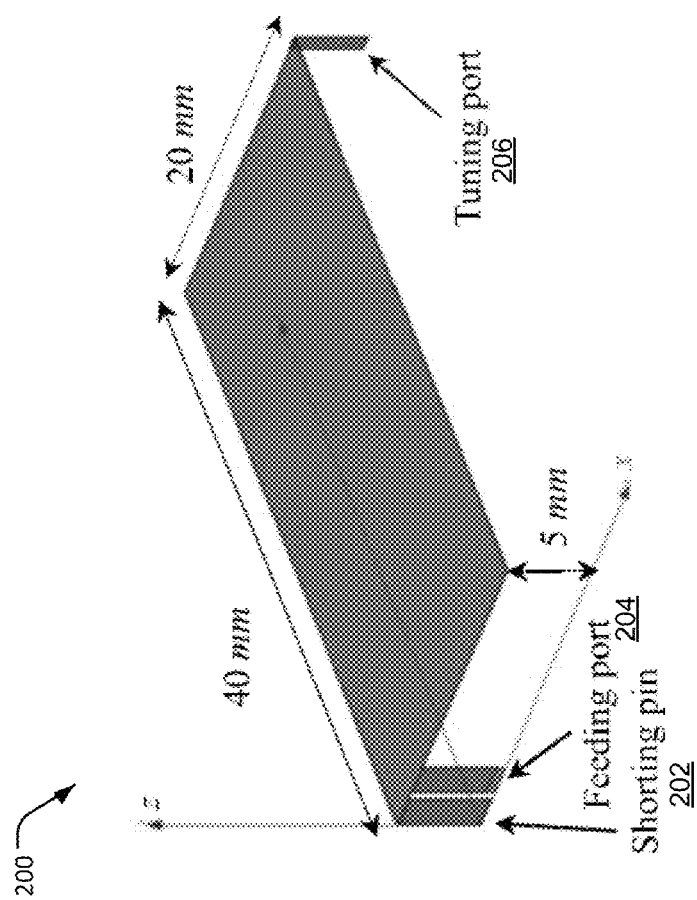
FIG. 2 is an example tunable antenna to transmit in narrow and wide bandwidth frequencies.

FIG. 2 shows an example tunable antenna 200 to transmit in narrow and wide bandwidth frequencies. Example dimensions are shown in FIG. 2. The antenna 200 includes a shorting pin 202, feeding port 204 and tuning port 206.

In this example, the antenna 200 is a tunable narrowband antenna used for frequency modulation applications. The antenna 200 is particular shown configured as a tunable planar inverted-F antenna or PIFA. In other implementations, a dipole antenna may be used. For example, a half wavelength center fed dipole antenna.

Frequency modulation or modulation of a tunable antenna may be applied to antenna 200. Antenna 200 may be a high quality or high Q antenna having a relatively small size (volume) as shown by the example dimensions in FIG. 2., of a high quality antenna or relatively small antenna as shown in FIG. 2. Frequency modulation or modulation of a tunable antenna is based on time variant boundary conditions shifting stored energy around the antenna 200 from one frequency to a different frequency based on the modulating signal (e.g., modulating signal 106 of FIG. 1). For example, if the resonant frequency of the antenna 200 is at $f_1$ and the modulating signal changes the resonant frequency of the antenna to $f_2$, the stored energy around the antenna will shift to the new frequency almost immediately. Therefore, the radiated field may be modulated by switching the antenna resonant frequency. The high quality factor of a narrowband antenna, such as antenna 200, allows antenna 200 to have a relatively small size. This way one can use a really small antenna to radiate at a wider bandwidth.

Figure 3:
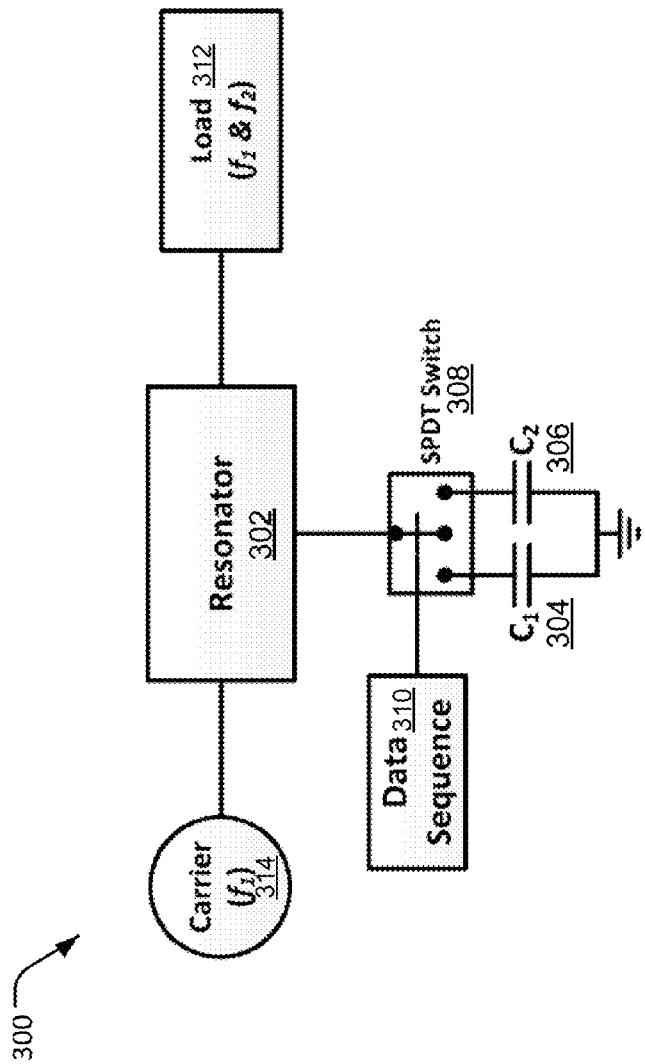
FIG. 3 is an example circuit for frequency modulation to allow for transmission for narrow and wide bandwidth frequencies.

FIG. 3 shows an example circuit 300 for frequency modulation. Frequency modulation may be applied for example using either a time variant inductor or a time variant capacitor. In this example, a time variant capacitor or switched capacitor is described; however, it is to be understood that such a time variant capacitor may be replaced with a switched inductor. FIG. 3 demonstrates the essence of the proposed technique. A high Q resonator 302 is loaded with two capacitors $C_1$ 304 and $C_2$ 306, through a single pole-double throw switch 308 controlled by data sequence 310. Two frequencies, $f_1$ and $f_2$ in load 312, are associated with different capacitance levels $C_1$ and $C_2$. $C_1$ (of capacitor $C_1$ 304) and $C_2$ (of capacitor $C_2$ 306) are generated by switching between capacitors $C_1$ 304 and $C_2$ 306. A single frequency $f_1$ in carrier 312 is fed to the resonator 302 and a second frequency is achieved in transient mode by using the time-domain characteristics of the resonator 302 as a frequency shifting device.

It is to be understood that more than two frequencies may be implemented. In other words, in certain implementations, in addition to $f_1$ and $f_2$, there may be $f_3$, $f_4$, $f_5$, etc., through appropriate switching between capacitors combinations.

Figure 4:
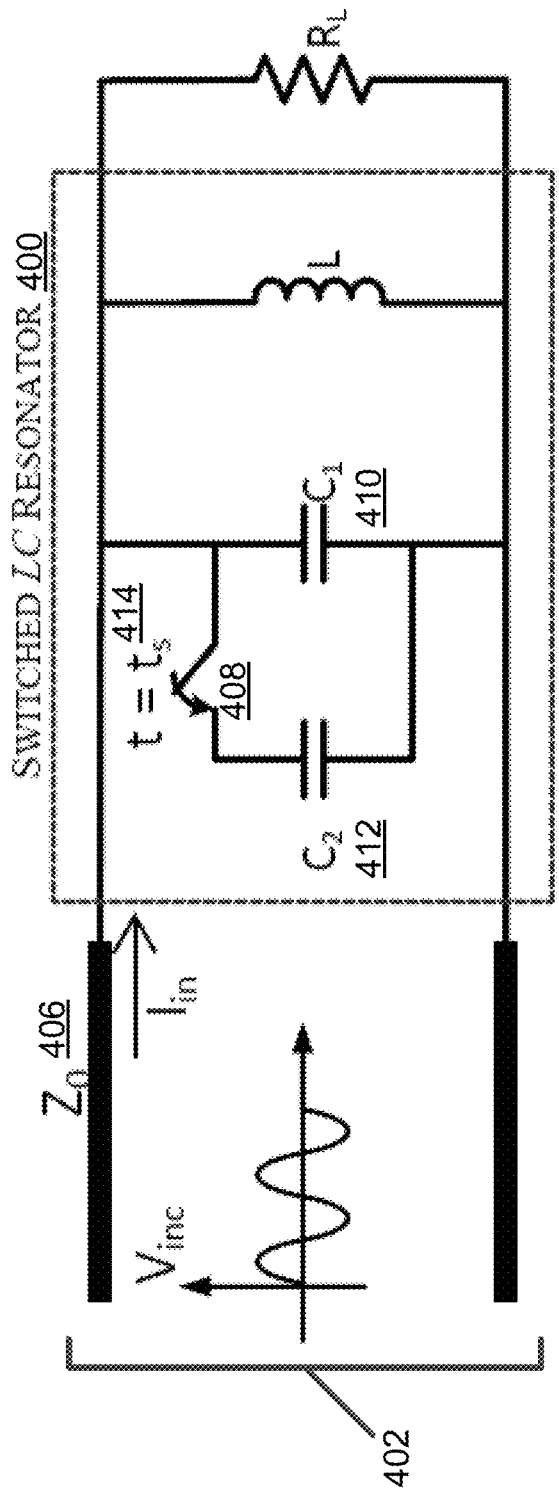
FIG. 4 is an example circuit LC-tank circuit used as a resonating structure for transmission for narrow and wide bandwidth frequencies.

FIG. 4 shows an example LC-tank circuit 400 as a resonating structure, such as resonator 302 of FIG. 3. The LC-tank circuit 400 is connective to a resistive load 402. A single-tone sinusoidal signal $V_{inc}(t)$ 404 is incident to the input port of the resonator LC-tank circuit 400 with a characteristic impedance $Z_0$. 406. A voltage-controlled switch 408 is used to change the capacitor from $C_1$ ($C_1$ 410) to $C_1+C_2$ ($C_1$ 410 and $C_2$ 412) at $t=t_s$ 414. Incident sinusoidal signal is at resonant frequency of the resonator LC-tank circuit 400, $\omega_{01} 1/\sqrt{LC_1}$. Assuming load is matched to characteristics impedance $Z_0$ 406, reflection coefficient at the input port is zero and voltage at the load is represented by equation (1) below:

$$v_R(t) = v_{inc}(t), (t < t_s) \quad (1)$$

$t=t_s$ 414, $C_2$ 412 is switched into the LC-tank circuit 400 and changes the resonant frequency of the LC-tank circuit 400. As a result, an input port will be mismatched respect to the characteristics impedance $Z_0$ 406 and part of the signal reflects back to the source. Thus, voltage at load resistor and input current for $t > t_s$ may be expressed as sum of incident and reflected signal $v_{ref}(t)$ as:

$$v_R(t) = v_{inc}(t) + v_{ref}(t) \quad (2)$$

$$i_{in}(t) = \frac{1}{Z_0}[v_{inc}(t) - v_{ref}(t)] \quad (3)$$

Eliminating $v_{ref}(t)$ from equation (2) and equation (3), the load voltage may be expressed in terms of input current and incident signal as:

$$v_R(t) = 2v_{inc}(t) - Z_0 i_{in}(t) \quad (4)$$

where $$i_{in}(t) = i_C(t) + i_L(t) + i_R(t) \quad (5)$$

$i_c(t)$ represents the current in the switched capacitor. Since capacitance is time-varying, the relation between voltage and current may be written as:

$$v_R(t) = 2v_{inc}(t) - Z_0 i_{in}(t) \quad (6)$$

q(t) is the total electric charge in the capacitors. Equation (6) indicates that a step-like variation in the value of capacitor at the switch-ON time, i.e., $C(t)=C_2 U(t-t_s)+C_1$ results in an instantaneous current as:

$$i_c(t) = C(t)\frac{dv_R}{dt} + v_R(t_s) \cdot C_2 \delta(t - t_s) \quad (7)$$

Equation (7) describes the presence of an impulsive component in the current when an ideal switch is applied to the capacitor. The magnitude of this impulsive component is a function of instantaneous voltage across the capacitor and value of switched capacitor $C_2$. On the other hand, at the switch-ON time $t_s$, electric charge continuity implies:

$$q(t_s^+) = q(t_s^-) \quad (8)$$

or:

$$C_1 v_R(t_s^-) = (C_1 + C_2) v_R(t_s^+) \quad (9)$$

Therefore, the load voltage right after the switching instant can be expressed as:

$$v_R(t_s^+) = \frac{C_1}{C_1 + C_2} v_R(t_s^-) \quad (10)$$

This discontinuity in the voltage results in a discontinuity in stored energy. To satisfy the electric charge continuity, an instant reduction in stored electric energy occurs in the LC-tank 400 right at the switching moment. The ratio of this energy reduction may be written as:

$$\frac{\varepsilon_e(t = t_s^+)}{\varepsilon_e(t = t_s^-)} = \frac{\frac{1}{2}(C_1 + C_2)v_C^2(t_s^+)}{\frac{1}{2}C_1 v_C^2(t_s^-)} = \frac{1}{1 + \frac{C_2}{C_1}} \quad (11)$$

The reduction in stored electric energy is a result of voltage drop at the switching moment which is necessary to satisfy the continuity of electric charge. For a larger switched capacitor $C_2$, energy reduction will be more significant. If switching time is synchronous with the zero crossing time of the incident signal, i.e. if $v_c(t_s)=0$ then at the switching instant instantaneous electric charge in the capacitor is zero and all stored energy is accumulated in the inductor in form of magnetic energy. Therefore, stored energy will be preserved and won't be disturbed by the switching procedure. This energy will be dissipated in the resistive load after switching.

For $t > t_s$, voltage at load is composed of two frequency components. First component is a leakage from incident signal at frequency $\omega_{01}=1/\sqrt{LC_1}$ which is mismatched to the input impedance of the resonator. The magnitude of this component is dictated by the mismatch factor. The second frequency component $\omega_{02}$ is due to a transient response produced by initial conditions of the inductor and capacitor in a source-free RLC circuit. In order to shift the stored energy into the frequency $\omega_{02}$ after switching instant, leakage from incident signal should be minimized. The maximum mismatch may be achieved by choosing the capacitor $C_2$ such that $\omega_{02}$ is far enough from $\omega_{01}$ or alternatively, if resonator has a high Q factor and bandwidth is sufficiently narrow, a large mismatch factor may be achieved by a small frequency deviation. Achieving the large mismatch factor may be shown by solving the differential equation of the circuit in FIG. 4. If incident signal is $v_{inc}(t)=V_s \sin(\omega_{01} t)$ and total capacitance is represented by $C_{tot}=C_1+C_2$ such that $\omega_{02}=1/\sqrt{LC_{tot}}$, leakage voltage at load can be expressed as:

$$v_{leak}(t) = \frac{V_s}{\sqrt{1+I^2}} \sin(\omega_{01} t - \tan^{-1} I) \quad (12)$$

Where:

$$I = Q \cdot \frac{\omega_{01}^2 - \omega_{02}^2}{2\omega_{01}\omega_{02}} \quad (13)$$

Q may be calculated at frequency $\omega_{02}$. Equation (13) denotes that magnitude of the leakage signal at source frequency $\omega_{01}$ is proportional to the Q factor of the resonator multiplied by difference of squares of resonant frequencies. As previously discussed, for a high Q resonator, the source is well isolated from the load after switch-ON time and the only significant component at the load is $\omega_{02}$.

Figure 5:
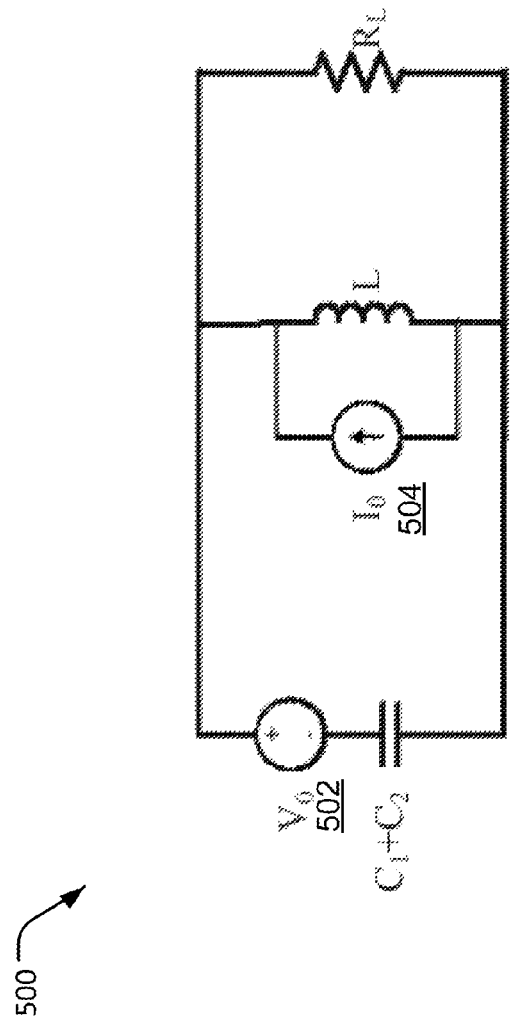
FIG. 5 is an example topology of source-free resonator after switching.

FIG. 5 shows an example topology of source-free resonator 500 after switching. Initial voltage of the capacitor $V_0$ 502 is calculated using continuity of electric charge as shown in Equation (14):

$$V_0 = v_R(t_s^+) = \frac{C_1}{C_1 + C_2} v_R(t_s^-) \quad (14)$$

Initial current of the inductor $I_0$ 504 can be also obtained using continuity of magnetic flux $\phi$ as:

$$\phi(t_s^+) = \phi(t_s^-) \quad (15)$$

or:

$$L_1 i_L(t_s^-) = L_1 i_L(t_s^+) \quad (16)$$

Therefore, $$I_0 = i_L(t_s^+) = i_L(t_s^-) \quad (17)$$

Assuming $t_s$ is synchronous with zero crossing of the incident signal, initial values are $V_0=0$ and $I_0=1/L\omega_0$. Transient voltage at load may be found by solving the differential equation for circuit in FIG. 5 and may be expressed as:

$$v_R(t') = \frac{\omega_{02}^2}{2\omega_{01}\omega_d} e^{-\alpha t'} V_s \sin(\omega_d t') \quad (18)$$

where $t'=t-t_s$. $\alpha$ and $\omega_d$ are attenuation factor and damped resonant frequency for the source-free resonator, respectively and can be calculated as:

$$\alpha = \frac{\omega_{02}}{2Q}; \omega_d = \omega_{02}\sqrt{1 - \frac{1}{4Q^2}} \quad (19)$$

For a high Q resonator (Q>>1), damped resonant frequency may be approximated by steady state resonant frequency $\omega_{02}=1/\sqrt{L(C1+C2)}$:

$$\omega_d \approx \omega_{02} \quad (20)$$

and transient voltage at the load may be expressed as:

$$v_R(t') \approx \frac{\omega_{02}}{\omega_{01}} e^{-\frac{\omega_{02}}{2Q}t'} V_s \sin(\omega_{02} t') \quad (21)$$

Eq. (21) shows that if $t_s$ is coincidental with zero-crossing of incident signal, the first peak after switching occurs at $t=t_s+T'/4$ and takes a value of $$\frac{\omega_{02}}{\omega_{01}} e^{-\frac{\pi}{4Q}}$$

that can be approximated by $$\frac{\omega_{02}}{\omega_{01}}$$

for a high Q resonator. For a non-zero initial value, first peak occurs at $t_s^+$ and its value is $$\frac{C_1}{C_1 + C_2} = \left(\frac{\omega_{02}}{\omega_{01}}\right)^2.$$

Since $\omega_{02} < \omega_{01}$, initial energy transferred to frequency $\omega_{02}$ for the zero initial condition is fourth power of the case of non-zero initial conditions. Total dissipated energy for $t > t_s$ may be calculated as:

$$E_{diss} = \frac{1}{R} \int_0^\infty v_R^2(t') dt' \quad (22)$$

$$= \frac{1}{R} \left(\frac{\omega_{02}}{\omega_{01}}\right)^2 V_s^2 \frac{2Q^3}{\omega_{02}(1+4Q^2)}$$

$$\approx \frac{1}{R} \left(\frac{\omega_{02}}{\omega_{01}}\right)^2 V_s^2 \frac{Q}{2\omega_{02}}$$

Replacing $$\frac{Q}{\omega_{02}} \text{ and } \left(\frac{\omega_{02}}{\omega_{01}}\right)^2$$

with R(C1+C2) and $$\frac{C_1}{C_1 + C_2},$$

respectively, yields:

$$E_{diss} = \frac{1}{2} C_1 V_s^2 \quad (23)$$

Equation (23) indicates that total dissipated energy in the load after switching instant is equal to the stored energy before switching. Thus, if switching occurs when instantaneous voltage across the capacitor is zero, entire stored energy will be dissipated in the load and there will be no energy reduction.

Figure 6:
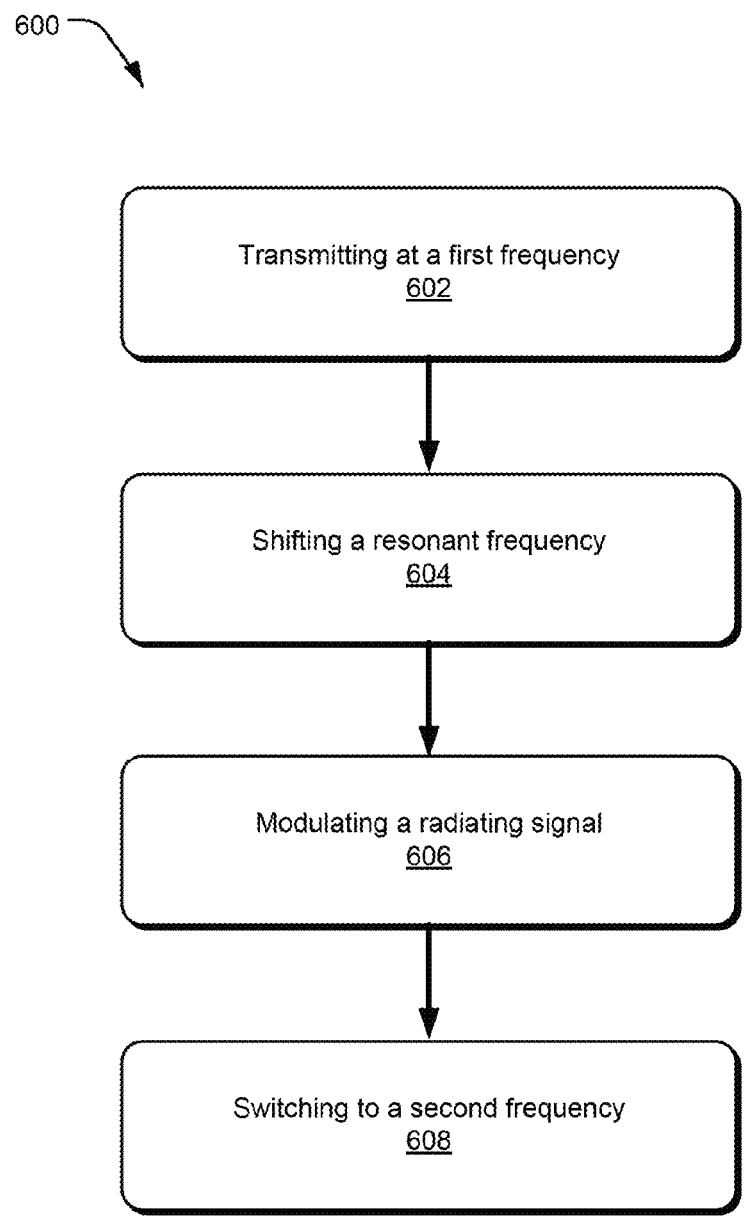
FIG. 6 is an example process for implementing transmission in narrow and wideband frequencies.

FIG. 6 shows an example process chart 600 illustrating an example method for implementing transmission in narrow and wideband frequencies. In particular, a high Q antenna may be implemented. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, transmitting at a first frequency is performed. The transmitting may be performed from a high Q antenna.

At block 604, shifting a resonant frequency is performed. The resonant frequency may be of that of a high Q antenna.

At block 606, modulating a radiating signal when shifting the resonant frequency is performed.

At block 608, switching to a second frequency from the modulating frequency is performed. It is also understood, that switching to third, fourth, and other frequencies may be performed. In certain implementations, original and secondary bandwidths may be smaller or larger relative to one another.

The following examples pertain to further embodiments:

Example 1 is a method of transmitting a wideband signal from a high Q antenna comprising: transmitting a first frequency from the high Q antenna; shifting a resonant frequency of the high Q antenna; modulating a radiating signal when shifting the resonant frequency; and switching the high Q antenna to a second frequency from the modulating.

In example 2, the method of example 1, wherein the first frequency is in a narrow band frequency spectrum of the high Q antenna.

In example 3, the method of example 1, wherein the first frequency is in a wideband frequency spectrum that is not of the high Q antenna.

In example 4, the method of example 1, wherein the second frequency is in a narrow band frequency spectrum of the high Q antenna.

In example 5, the method of example 1, wherein the second frequency is in a wideband frequency spectrum that is not of the high Q antenna.

In example 6, the methods in any of examples 1 to 5, wherein the modulating the radiating signal is performed by using frequency shifts of the high Q antenna.

In example 7, the methods in any of examples 1 to 5, wherein the modulating is frequency shift keying modulation.

In example 8, the method of example 1, wherein the switching the high Q antenna is at a switching frequency such that stored energy of the high Q antenna is not disturbed.

In example 9, the method of example 1, wherein the switching the high Q antenna is at a switching frequency to allow the radiating signal to be transmitted independent of impedance bandwidth of the antenna.

In example 10, the method of example 1, wherein a single RF source is used to excite the first, second and other carrier frequencies.

In example 11, the method of example 11 further comprising switching to subsequent frequencies.

Example 12 is a device comprising: a tunable high Q antenna configured to transmit in a narrow band frequency spectrum; a single RF source configured to power the tunable high Q antenna; and a modulating signal source that comprises a high Q resonator responsive to a frequency shift of the tunable high Q antenna, wherein the modulating signal source is configured to modulate to a frequency in a wide band frequency spectrum.

In example 13, the device of example 12, wherein the tunable high Q antenna is configured to respond to a required time variation.

In example 14, the device of example 12, wherein stored energy around the tunable high Q antenna is configured to shift a transmitted frequency of the tunable high Q antenna.

In example 15, the device of any of examples 12 to 14, wherein the modulating signal source comprises a time variant inductor for frequency modulation.

In example 16, the device of any of examples 12 to 14, wherein the modulating signal source comprises a time variant capacitor for frequency modulation.

In example 17, the device of any of examples 12 to 14, wherein the modulating signal source comprises switching capacitors controlled by a binary data signal.

Example 18 is a device comprising: a tunable antenna configured to transmit in a first band frequency spectrum; an RF source configured to feed the tunable antenna; and a modulating signal source that comprises a high Q resonator responsive to a frequency shift of the tunable antenna, wherein the modulating signal source is configured to modulate to a frequency in second band frequency spectrum.

In example 19, the device of example 18, wherein the tunable antenna is narrowband high Q antenna.

In example 20, the device of example 18, wherein the modulating signal source comprises switching capacitors.

What is claimed is:

1. A method of transmitting a wideband signal from a high Q antenna comprising:
transmitting at a first frequency from the high Q antenna;
shifting a resonant frequency of the high Q antenna;
modulating a radiating signal when shifting the resonant frequency; and
switching the high Q antenna to a second frequency, wherein a stored energy during the switching is not disturbed.

* * * * *